May 27, 1941.     D. C. ROCKOLA     2,243,124
ROAD VEHICLE
Filed Feb. 20, 1939          2 Sheets-Sheet 1
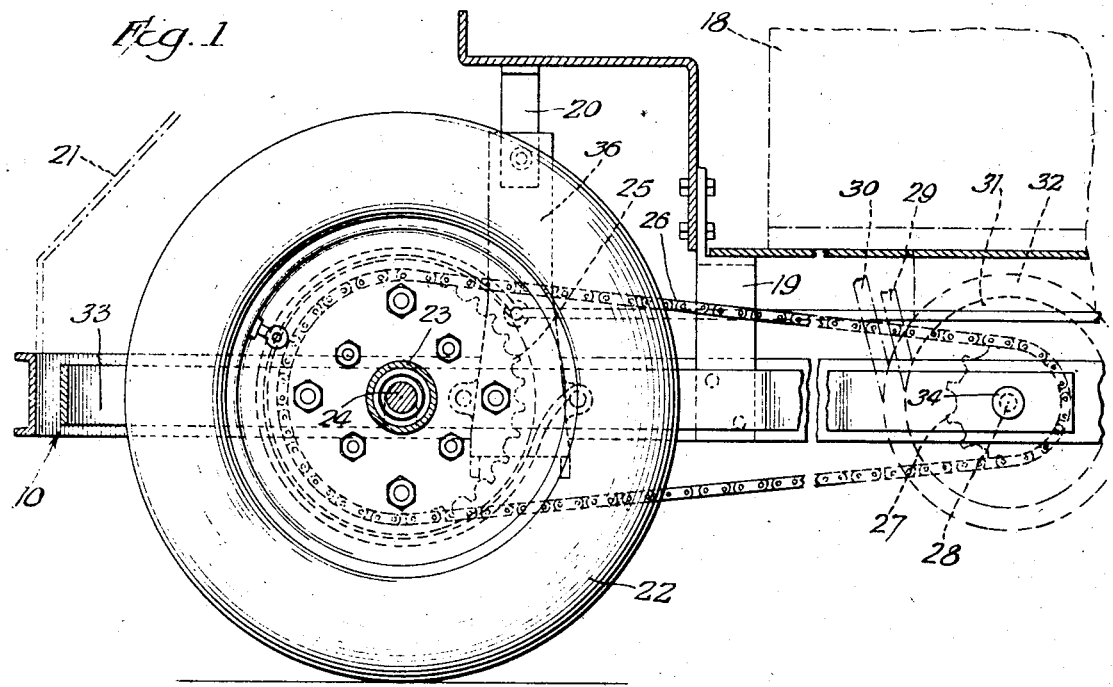
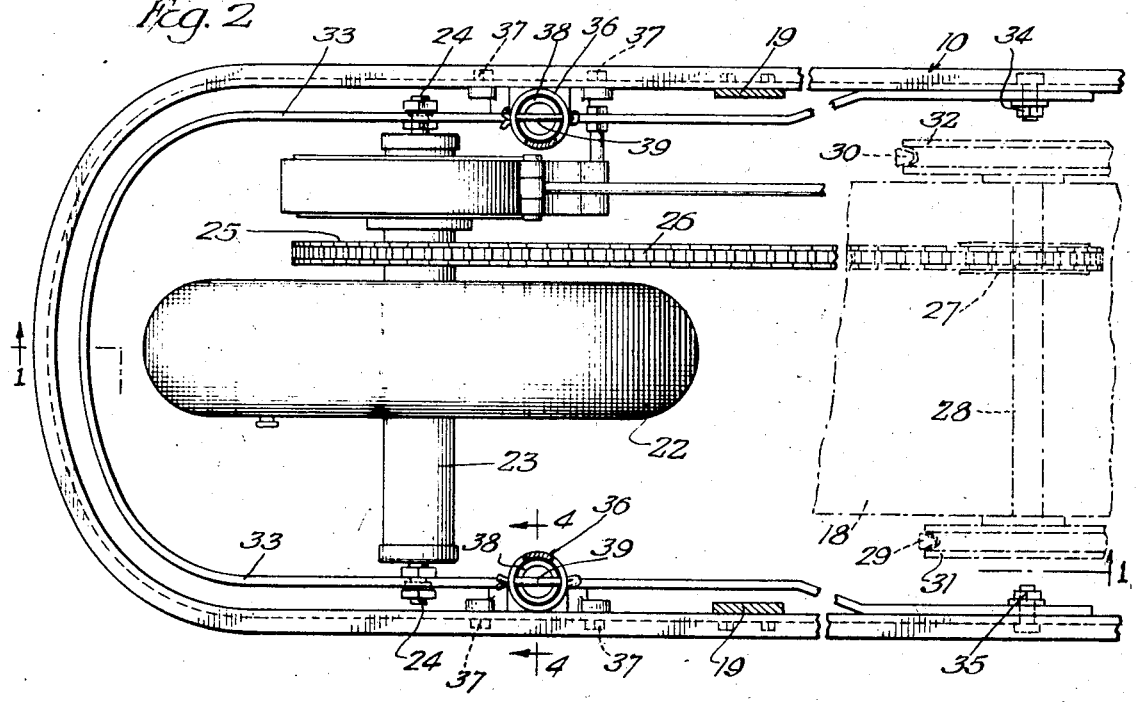
Inventor:
David C. Rockola
BY Sheridan, Davis & Cargill
Attys May 27, 1941.  D. C. ROCKOLA  2,243,124
ROAD VEHICLE
Filed Feb. 20, 1939   2 Sheets-Sheet 2
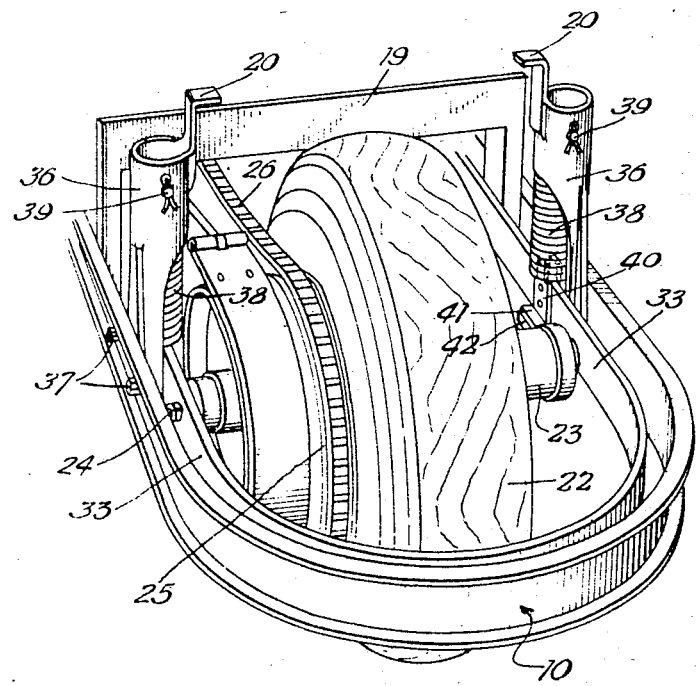
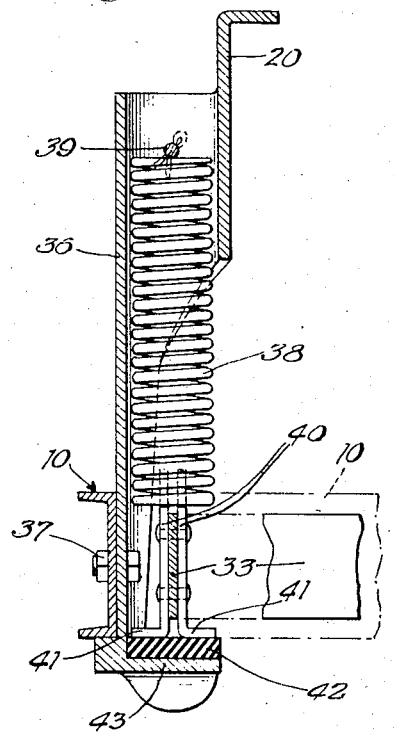
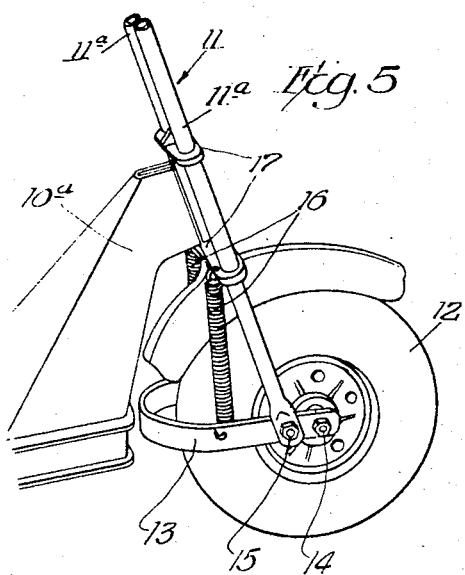
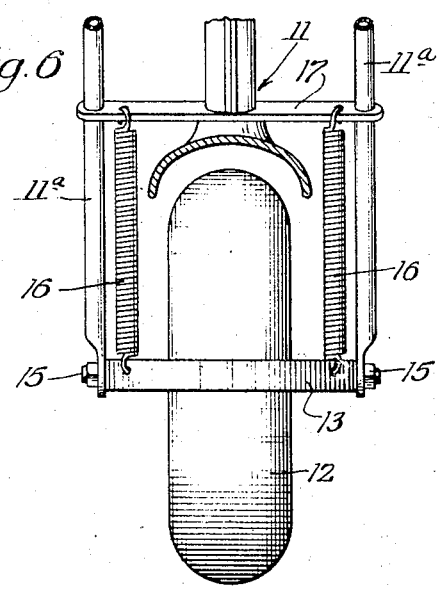
Inventor
David C. Rockola
BY Sheridan, Davis & Calgill
Attys.

Patented May 27, 1941

2,243,124

UNITED STATES PATENT OFFICE 2,243,124

ROAD VEHICLE

David C. Rockola, Chicago, Ill., assignor to Rock-Ola Manufacturing Corporation, Chicago, Ill., a corporation of Delaware Application February 20, 1939, Serial No. 257,396

3 Claims. (Cl. 180—33)

This invention relates to improvements in road vehicles.

One object of the invention is to provide an improved cushioned or floating mounting for wheels of a vehicle such as a motorcycle of the scooter-type, for example, whereby the wheels, either front or rear or both, are movable against spring resistance relative to a load carrying frame for resiliently supporting the frame under imposed loads and cushioning the same against road impacts imparted to the wheels.

Other objects of the invention relate to various features of construction and arrangement of parts which will be apparent from a consideration of the following specification and accompanying drawings, wherein:

Fig. 1 is a broken vertical elevation of a vehicle embodying the present improvements and taken approximately on the line 1—1 of Fig. 2;

Fig. 2 is a broken top plan of the structure shown in Fig. 1;

Fig. 3 is a perspective view of the rear drive wheel and associated mechanism shown in Figs. 1 and 2;

Fig. 4 is an enlarged vertical sectional view taken on line 4—4 of Fig. 2;

Fig. 5 is a perspective view of the front wheel mounting mechanism of the vehicle; and Fig. 6 is an enlarged broken elevation of the front wheel and wheel mounting mechanism looking to the right in Fig. 5.

In the drawings, 10 indicates generally a main frame which at its rear embraces the rear drive wheel of the vehicle and at its forward end is provided with an upstanding support or post to which the steering frame or fork 11 is pivotally attached by any approved means. The member 11 which in the embodiment illustrated comprises a pair of posts 11a may also be considered as part of the main frame in that a portion of the load carried by the vehicle is imposed thereon.

A pneumatic front wheel 12 is mounted between the posts or arms 11a of the member 11 by means of a U-shaped or yoke-like auxiliary frame 13, in the ends of which is journalled or attached the front axle 14 of the wheel. The lower ends of the member 11a are pivotally attached as at 15 to the auxiliary frame 13 on an axis disposed a suitable distance to the rear of the axis of rotation of the wheel 12. Tension springs 16 are attached to the yoke member 13 at points to the rear of the axis of the pivot members 15 and are also attached to the member 11, as to the lower of two cross bars 17. When a load is imposed on the vehicle, a downward thrust is exerted on the frame 13 at the axis of the pivot members 15, the frame tending to pivot or turn about the axle 14. This movement is resisted, however, by the springs 16, the tension of which is sufficient to resist excessive downward swinging movement of the member 13 and serve to cushion or "float" the imposed load at the forward end of the vehicle.

In travel, the road impacts imparted to the front wheel which tend to thrust it upwardly are partially absorbed by the spring 16, thus avoiding the imposition of such impacts or upward thrusts directly and with full force on the frame member 11. Such impacts delivered to the front wheel by an obstruction in the road tend to rock the frame 13 counter-clockwise as viewed in Fig. 5 about the axis of the pivot members 15 and against the tension of the springs. The construction thus not only provides a cushioned support for the imposed load but it acts as a shock absorber for the vehicle and improves the riding qualities thereof.

The main frame 10 supports a motor indicated diagrammatically by the numeral 18 and may also be provided with suitable supports 19—20 for supporting a driver's seat (not shown) as well as for partially supporting a casing or body 21 indicated fragmentarily in Fig. 1 which encloses the drive wheel 22, motor 18 and associated mechanism. The drive wheel 22 as shown in Fig. 3 is located within the confines of the main frame 10. The wheel 22 is mounted on a driven tube or sleeve 23 which is journalled on a non-rotating axle 24, the particular construction of which is not per se pertinent to the present improvements. The sleeve 23 is provided with a sprocket 25 operable by a chain 26 which in turn is driven by a sprocket 27 mounted on a shaft 28 of the motor 18 and operable from the drive shaft of the motor by any approved mechanism such as by one or more belts 29—30 trained over pulleys 31 and 32, respectively, and operable by pulleys (not shown) which may be mounted on the crank shaft of the motor. This driving mechanism referred to is more particularly shown and described in my copending application, Serial Number 257,395, filed February 20, 1939.

The axle 24 is mounted in opposite sides of a U-shaped auxiliary frame 33, the forward ends of which are pivotally secured to the main frame 10 as at 34 and 35, the pivotal axis of the auxiliary frame being in alignment with the axis of the shaft 28 whereby the frame 33 and the wheel 22 may move pivotally or arcuately with reference to the main frame 10 without hindrance by the drive chain 26.

For the purpose of providing a cushioned or resilient support between the rear portion of the main frame 10 and the auxiliary frame 33, there is secured to the main frame a spring retaining member 36 which may be bolted to the main frame as at 37. A compression spring 38 is located in the member 36 and restrained from upward movement by means of a transverse stop 39. The lower end of the spring is arranged to rest on the subjacent portion of the auxiliary frame 33 (see Fig. 4) which is provided with spring retaining members 40 which project upwardly into the spring 38 and at their lower ends are directed outwardly to provide feet or stops 41 arranged to contact or bottom on a pad of cushioning material 42 such as of rubber, or the like. The pads 42 are supported by a horizontal flange or seat 43 which may be formed, as illustrated in Fig. 4, integrally with the member 36. The cushioning structures just described are shown in Fig. 2 as being located a short distance forwardly of the wheel axle although such members of different cushioning characteristics may be located in other convenient positions to provide desirable "floating" inter-connections between the main frame 10 and the auxiliary frame 33.

The load imposed on the main frame, that is, the load of the motor 18 and associated parts as well as the carried load, whether goods or passenger, tends to move the main frame downwardly, which movement at the rear of the vehicle is of course resisted by the springs 38, said springs as mentioned above, being supported at their lower ends by the auxiliary frame 33 which in turn is supported upon the axle 24 on which the wheel 22 is mounted. The entire vehicle body is thus spring supported, both at the front and rear ends thereof. Road impacts imparted to the rear wheel or wheels 22 exert upward thrusts on the auxiliary frame 33 and are in turn imparted without excessive shock to the main frame and the body of the vehicle and supported load by reason of the interposed resilient or cushioning members 38 as will be seen. The main frame therefore and body and carried loads are supported on the auxiliary frames 13 and 33 at the front and rear, respectively, in the manner described to provide a floating support for the main frame and its load, thus shielding the same from excessive road impacts and improving the riding qualities of the vehicle. It will be understood that the floating supports described may be accommodated to different loads by the use of springs having the required cushioning characteristics or by locating such springs at different distances from the pivotal axes of the respective auxiliary frames 13 and 33.

While I have shown and described certain embodiments of my improvements for the purpose of illustration, it will be apparent that various changes may be made therein without departing from the spirit of the invention.

What I claim as new and desire to cover by Letters Patent is:

1. In a road vehicle comprising a horizontal main frame, a motor supported thereby provided with a rotary driving member having an axis disposed transversely of said frame, a drive wheel and axle assembly located between side portions of said main frame, means operable by said driving member for driving said wheel, and means for accommodating relative vertical movement of said wheel and axle assembly with respect to said main frame comprising a spring-cushioned auxiliary frame of U-shape disposed between the side members of the main frame and carrying said assembly and pivotally attached adjacent the ends of the arms thereof to said main frame on an axis coincident with the transverse axis of said driving member.

2. In a road vehicle, a main load carrying frame, an auxiliary frame of U-shape disposed within said main frame and pivotally attached adjacent the ends thereof to said main frame, a ground wheel and axle assembly carried by said auxiliary frame, spring cushioning members at each side of said main frame and operating on said auxiliary frame for resiliently supporting said main frame and cushioning the latter against road impacts imparted by said wheel to said auxiliary frame, a motor carried by said main frame and provided with a rotary drive member located coaxially with reference to the pivotal axis of said auxiliary frame, and driving means operable by said drive member for driving said wheel.

3. In a road vehicle comprising a main body-supporting frame, a driving motor mounted on said frame provided with a drive member having an axis disposed transversely of the frame, an auxiliary frame disposed within said main frame, and pivotally secured thereto on an axis coincident with the axis of said driving member, a drive wheel carried by said auxiliary frame and arranged to be driven by said motor drive member, a pair of cushion members carried by said main frame for engagement by said auxiliary frame for limiting downward swinging movement thereof with respect to said main frame, and a pair of spring members secured to said main frame and acting on said auxiliary frame for cushioning upward movement of the auxiliary frame relative to the main frame under stresses of imposed loads on the main frame and road shocks imparted to the drive wheel.

DAVID C. ROCKOLA.